United States Patent [15] 3,638,874

Naito et al. [45] Feb. 1, 1972

[54] REEL BRAKE FOR AN ENDLESS TAPE CARTRIDGE

[72] Inventors: Nobuatsu Naito, Tokyo; Kasuhiko Nakajima, Fujisawa-Shi; Yoshio Watanabe, Tokyo, all of Japan

[73] Assignees: Pioneer Electric Corporation; Apollon Music Industrial Corporation, both of Tokyo, Japan

[22] Filed: Oct. 13, 1969

[21] Appl. No.: 866,674

[30] Foreign Application Priority Data

Oct. 14, 1968 Japan ..................................43/88809

[52] U.S. Cl. ......................................................242/55.19 A

[51] Int. Cl. ........................................................B65h 17/48

[58] Field of Search ................242/55.19, 55.19 A, 197, 198, 242/199, 200; 352/128; 179/100.2 Z

[56] References Cited

UNITED STATES PATENTS

| | | | |
|---|---|---|---|
| 2,943,805 | 7/1960 | Loewe | 242/198 |
| 3,092,346 | 6/1963 | Goodell et al. | 242/197 |
| 3,161,362 | 12/1964 | Smith | 242/55.19 A |
| 3,259,331 | 7/1966 | Liddle | 242/198 X |
| 3,497,157 | 2/1970 | Hanes et al. | 242/198 X |

*Primary Examiner*—Billy S. Taylor
*Attorney*—Sughrue, Rothwell, Mion, Zinn & Macpeak

[57] ABSTRACT

An endless tape cartridge which comprises a rotatable reel carrying an endless tape, a tape guide roller, a pad and a pinch roller for feeding and guiding the endless tape, is further provided with a spring-biased, reciprocating reel-braking lever movable along a keyway guide groove in the bottom of the cartridge casing, with one toothed arcuate end engageable with a toothed annular recess within the reel and the other end engageable with a push rod mounted on the tape player to automatically release the brake acting on the reel upon insertion of the cartridge.

4 Claims, 4 Drawing Figures

PATENTED FEB 1 1972 3,638,874

INVENTORS.
NOBUATSU NAITO
KAZUHIKO NAKAJIMA
YOSHIO WATANABE

BY Sughrue, Rothwell, Mion, Zinn & Macpeak
ATTORNEYS.

REEL BRAKE FOR AN ENDLESS TAPE CARTRIDGE

BACKGROUND OF THE INVENTION

1. Field of the Invention

This invention relates to reel brakes for an endless tape cartridge.

2. Description of the Prior Art

Tape cartridges such as those carrying an endless tape normally contain pinch rollers and are so constructed that the tape is fed out and wound up by rotation of the reel carrying the tape and conventionally, when the tape recorder cartridge is not being used there are no means for braking or stopping the rotation of the reel carrying the tape. Accordingly, when the reel is abruptly rotated as when the cartridge is not being used as when the cartridge mounted on a vehicle tape player or reproducer in the unused state, the reel may inadvertently rotate on its rotatable support shaft generally provided at the center of the lower half of the cartridge casing with the result that the tape tends to move out of the cartridge and thus becomes impossible to run.

SUMMARY OF THE INVENTION

This invention contemplates the elimination of the aforementioned disadvantages of conventional cartridges for tape recorders and reproducers and provides a new and improved reel stop or brake for an endless tape cartridge. The reel brake includes a reel-braking lever provided on the bottom of the lower half of the cartridge casing which carries the endless tape, the lever slidable in a longitudinal direction and extending toward the forward end of the cartridge. The brake and its integral lever is so situated within the cartridge that when the cartridge is not in use the reel is engaged with the brake and is further provided in such a manner that when the cartridge is mounted within the player or reproducer, the lever is interlocked mechanically with a push rod provided on the player. The push rod therefore pushes the braking lever to slide the braking lever in such a direction that the engagement of the brake and the tape reel is released in such a manner as to eliminate any danger that once the cartridge is positioned within the tape reproducer, it is possible to run the tape.

DESCRIPTION OF THE PREFERRED EMBODIMENT

Figure 1:
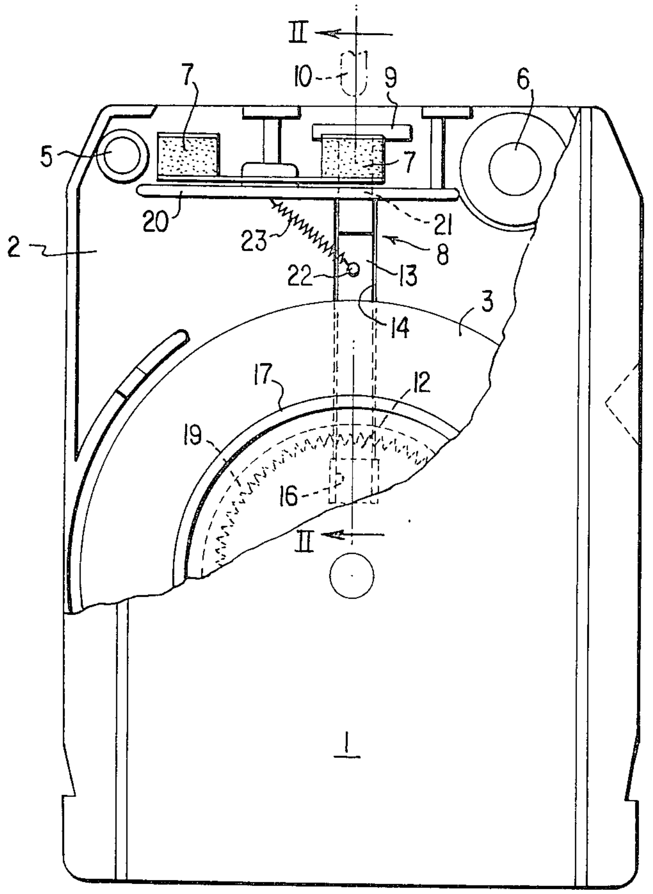
FIG. 1 is a partial side view in section of an endless tape carrier provided with a reel brake constructed in accordance with the present invention.
Figure 4:
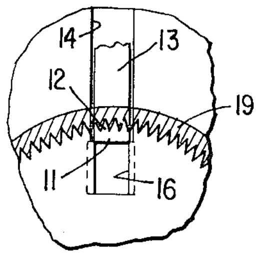
FIG. 4 is a plan view of a portion of the cartridge of FIG. 1 showing the engagement between the integral brake of the braking lever and the tape carrying cartridge, about lines IV—IV of FIG. 2.
Figure 3:
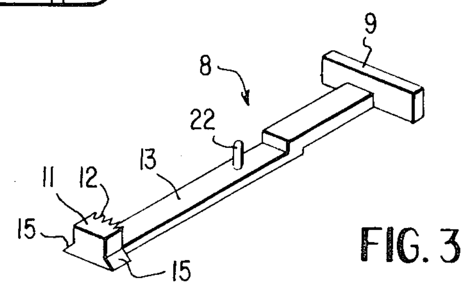
FIG. 3 is a perspective view of the braking lever and integral brake of the present invention.

Referring to the drawing, which shows one embodiment of the present invention, an endless tape cartridge is formed of two sections, the upper half casing 1 and the lower half casing 2 which supports a reel 3 rotatably mounted therein. An endless tape (not shown) is wound about the reel with the reel mounted for rotation about rotary shaft 4 which in turn is fixed to the center of the lower half 2 of the cartridge and extends upwardly from the bottom thereof. The single reel feeds and winds up the tape, which in a conventional manner passes over tape guide roller 5, pinch roller 6 and pad 7 with the pinch roller 6 being rotated by a capstan (not shown).

Figure 2:
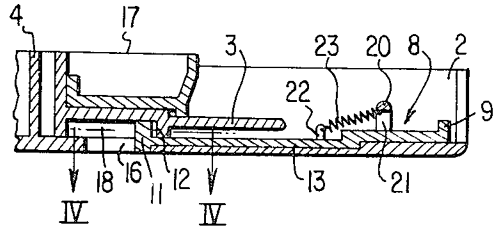
FIG. 2 sectional view of a portion of the cartridge of FIG. 1 taken about lines II—II, without the pad.

The present invention is directed to a braking lever 8 having one end 9 positioned for contact with the end of a push rod 10 carried by the tape player (not shown) or reproducer. The other end 11 of the braking lever is provided with a raised portion carrying the plurality of ratchet teeth 12 facing the direction of the outboard end 9. An offset slide portion 13 connects ends 9 and 11 and engages a longitudinal groove 14 provided within the bottom of the lower half 2 of the cartridge, FIG. 2. The ratchet inner end 11 of the brake lever is provided near its bottom with dovetails 15 on each side thereof which engage similar dovetails 16 provided within the bottom of the lower half 2 of the cartridge to prevent the end 11 from rising upward when in place. The spool 17 upon which the tape is wound, is carried by reel 3 and may be integrally formed with the reel as shown in FIG. 2 so that the tape is wound on the inclined wall on the outside thereof. An annular recess 18 is provided within the lower portion of reel 3 and carries on its circumferential wall, ratchet teeth 19, the ratchet 19 being a relatively large diameter and of such configuration as to readily engage with the ratchet teeth 12 provided on end 11 of the braking lever which in effect constitutes an integral brake means. The braking lever 8 is carried by the bottom half of the cartridge in such manner that it passes through a hole 21 formed within sidewall 20 of the lower half 2 of the cartridge and further engages the longitudinal groove 14 within the same bottom half of the cartridge. With the dovetails being in engagement, the lever readily slides in a longitudinal direction within the cartridge. A return spring 23 is coupled at one end to a pin 22 which is fixed to lever 8 intermediate of its ends and the other end of the return spring is coupled to the sidewall 20 so as to bias the brake lever 8 outward so that the ratchet teeth 12 readily engage the circumferentially extending ratchet teeth 19 on the reel to positively stop rotation of the reel upon engagement.

In the operation of the thus constructed arrangement, if the cartridge is mounted on a vehicle tape player or reproducer for instance, the end 9 of the braking lever 8 is pushed against the bias of spring 23 longitudinally toward the rotary shaft 4 by the end of push rod 10. This causes disengagement of the ratchet teeth 12 and 19 with the result that the reel 3 is freely rotatable about the rotary shaft 4. Since the cartridge is positively mounted on the player or reproducer by a lock mechanism (not shown) which is separately provided, the reel cannot be stopped from rotation unless the cartridge is again withdrawn from the player or reproducer. Accordingly, if the cartridge is withdrawn from the player, the lock mechanism is released so that the pressure of the push rod 10 when released results in the allowance of the braking lever 8 to move to reset position by return spring 23 in such a manner that the ratchet 12 and 19 reengage with the reel being positively stopped or braked immediately and not rotated quick to foul the mechanism.

It is understood from the foregoing description that since the arrangement of the present invention prevents the endless tape from moving out of the cartridge when the cartridge is quickly moved once reproduction ceases, the braking lever will always engage the cartridge in a longitudinal direction of movement. This is facilitated because the outboard end of the braking lever 8 passes through a hole provided within the sidewall of the lower half of the cartridge, the braking lever sides and bottom engage a longitudinal groove in the lower half of the same cartridge, the inboard end of the braking lever is in dovetail engagement with a portion of the cartridge and further, the step configuration to the braking lever ensure that the biasing spring 23 will cause longitudinal movement of the braking lever a distance sufficient to abut the shoulder of the braking lever with the end of the groove receiving the slide portion 13 at the point where the ratchet teeth 12 and 19 engage.

What is claimed is:

1. An endless tape cartridge for use with a tape recorder or reproducer having a push rod extending into a cartridge receiving recess, said cartridge comprising: a reel rotatably mounted within said cartridge and carrying an endless tape, a tape guide roller, a pinch roller and a pad for feeding and guiding said tape during operation of said recorder, a brake lever carried by said cartridge and mounted for movement toward and away from said tape reel, including a slide portion engaging a groove formed within the bottom of said cartridge on the interior surface thereof, said brake lever having its outer end adapted to contact said push rod during insertion of said cartridge within said recorder recess, the inner end of said brake lever being formed with dovetail surfaces, cooperating dovetail surfaces provided within the cartridge groove to prevent movement of said lever in a direction away from said groove, said tape reel being provided with an annular recess on its lower face, circumferentially extending ratchet teeth carried by said annular recess, cooperating ratchet teeth carried by said brake lever at the inner end thereof and adapted to engage the ratchet teeth of said annular groove and means tending to bias said brake lever away from said reel to assure positive braking of said rotatable reel when said cartridge is removed from said recorder or reproducer recess.

2. The cartridge as claimed in claim 1 wherein said biasing means comprise: a coil spring having one end coupled to said brake lever intermediate of its ends and the other end fixed to a cartridge casing wall.

3. The cartridge as claimed in claim 2 wherein said groove receiving the sliding portion of said braking lever terminates inwardly of said casing wall, and said braking lever extends outwardly therefrom, through an opening in said casing wall to further guide said braking lever along its path of movement towards and away from said reel.

4. An endless tape cartridge for use with a tape recorder or reproducer having a member extendable into a cartridge receiving recess, said cartridge comprising:

a reel rotatably mounted within said cartridge and carrying an endless tape, a tape guide roller, a pinch roller, a pad for feeding and guiding said tape during operation of said recorder, a brake lever carried by said cartridge and mounted for movement toward and away from said tape reel including a slide portion engaging a groove formed within the bottom of said cartridge on the interior surface thereof, said brake lever having its outer end adapted to contact said member during insertion of said cartridge within said recorder recess, the inner end of said brake lever being formed with dovetailed surfaces, cooperating dovetailed surfaces provided within the cartridge groove to prevent movement of said lever in a direction away from said groove, an annular recess formed within one face of said tape reel with circumferentially extending ratchet teeth carried by said annular recess, cooperating ratchet teeth carried by said brake lever at the inner end thereof and adapted to engage the ratchet teeth of said annular groove, and means tending to bias said brake lever away from said reel to assure positive braking of said rotatable reel when said cartridge is removed from said recorder or reproducer recess.

* * * * *